(12) United States Patent
Faubion

(10) Patent No.: US 6,813,843 B1
(45) Date of Patent: Nov. 9, 2004

(54) TOOL ALIGNMENT INDICATOR APPARATUS AND METHOD

(75) Inventor: Guy R. Faubion, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/430,391

(22) Filed: May 7, 2003

(51) Int. Cl.[7] .............................. G01B 7/30; G01B 5/24
(52) U.S. Cl. ............................ 33/638; 33/520; 33/534
(58) Field of Search ..................... 33/638, 640, 520, 33/534, 535, 645, 613, 642

(56) References Cited

U.S. PATENT DOCUMENTS

| | | | | |
|---|---|---|---|---|
| 3,918,165 A | * | 11/1975 | Czernik et al. | 404/87 |
| 4,328,621 A | * | 5/1982 | Benjamin | 33/534 |
| 4,338,723 A | * | 7/1982 | Benjamin | 33/535 |
| 4,386,532 A | * | 6/1983 | Benjamin | 73/862.045 |
| 4,406,069 A | | 9/1983 | Clement | 33/642 |
| 4,506,448 A | * | 3/1985 | Topping et al. | 33/628 |
| 6,583,869 B1 | * | 6/2003 | Sheridan | 356/153 |

* cited by examiner

Primary Examiner—Christopher W. Fulton
Assistant Examiner—R. Alexander Smith
(74) Attorney, Agent, or Firm—Baker & Hostetler LLP

(57) ABSTRACT

An apparatus for indicating alignment between a work surface of a work piece includes a base having three switches that contacts the work surface. The switches each activate a respective visual indicator to indicate when a desired alignment condition is present.

19 Claims, 3 Drawing Sheets

TOOL ALIGNMENT INDICATOR APPARATUS AND METHOD

FIELD OF THE INVENTION

The present invention relates to the field of indicating alignment between a machine tool and a work surface. More particularly, the present invention relates to an apparatus and method for indicating a desired angular relationship between a machine tool and a work surface.

BACKGROUND OF THE INVENTION

In the operation of machine tools and the like, it is often desirable to maintain a desired alignment between a work surface and the tool, so that the tool engages the work surface as desired or required. For example in some instances, it is desired that the tool be exactly perpendicular or normal in relation to the work surface or the work part. Typically, it is desired that this alignment of the tool achieved prior to tool operation and maintained during operation. In the case of a drill, it is often desired that the drill bit be perpendicular to the work surface. This is sometimes attempted by simple viewing and hand-eye adjustment. Drill guides are also known which have a flat surface or a base that when fully rested flat on the work piece will provide alignment. However, these guides do not provide an indication of whether they are fully rested flat or not, and thus do not provide notice to the operator whether the tool is in fact normal or is undesirably tilted.

Furthermore, during operation of machine tools such as drills, it is commonly necessary to repeatedly reestablish proper alignment between the drill and the work surface. The aforementioned realignment is oftentimes required due to stresses that may develop during operation of the drill that can create misalignment. This misalignment can be caused by the torque forces created by the interaction of the rotating drill bit and the work surface or piece. The misalignment can also result from operator error and/or operator tool misplacement.

Some current methods for aligning tools with work surfaces and/or work pieces employ mechanical leveling or alignment devices that mount to the tool and to the work surface. These mechanical devices involve separate levels or leveling devices on the tool and the work surface and require the operator to make readings from both to determine tool alignment. Upon obtaining a similar reading from each of the leveling devices, the tool is determined to be aligned at least more or less correctly.

The above-described alignment devices have drawbacks however. For example, they are dependent upon the skill of the operator for determining an exact similar reading for each of the leveling devices. In addition, the accuracy of the alignment devices is dependent upon the similarity of the leveling devices themselves as well as their manner of attachment to the tool and to the work surface.

Furthermore, the leveling devices currently used typically are dependent upon a stable environment in order for the machine tool operator to be able to obtain an accurate reading from the respective leveling devices. It therefore may be difficult to properly align the machine tool and the work surface if the tool or work piece is vibrating or not mounted on a stable surface. Further, the above-referenced leveling devices do not provide convenient real time indicators that alert the tool operator of misalignment during operation of the tool.

Accordingly, there is a need in the art to provide a tool alignment apparatus and method that allows a machine tool operator to easily determine whether the tool is in or out of desired alignment relative to the work surface. There is further a need for a method and apparatus for tool alignment that gives real time alignment information with respect to the tool and the work piece during tool operation.

SUMMARY OF THE INVENTION

The foregoing needs are met, to a great extent, by the present invention, wherein in one aspect an apparatus and method are provided for indicating a desired alignment condition between a work tool, such as for example a drill bit, and a work surface of a work piece.

In accordance with one embodiment of the present invention, an apparatus a device for indicating alignment between a tool and a work surface of a work piece, comprising: a base adapted to rest on the work surface; a first indicator; and a first switch disposed on said base and adapted for contact with the work surface, wherein said first switch activates said first indicator.

In accordance with another embodiment of the present invention, an apparatus a device for indicating alignment between a tool and a work surface comprising: means for supporting the tool against the work surface; means for switching disposed on said means for supporting; and means for indicating an alignment condition responsive to said switch means.

In accordance with yet another embodiment of the present invention, a method a method for indicating alignment between a tool and a work surface of a work piece, comprising: pressing a base of an alignment device against the work surface so that at least one switch on the base is activated; and reading at least one indicator activated by the activation of the at least one switch.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
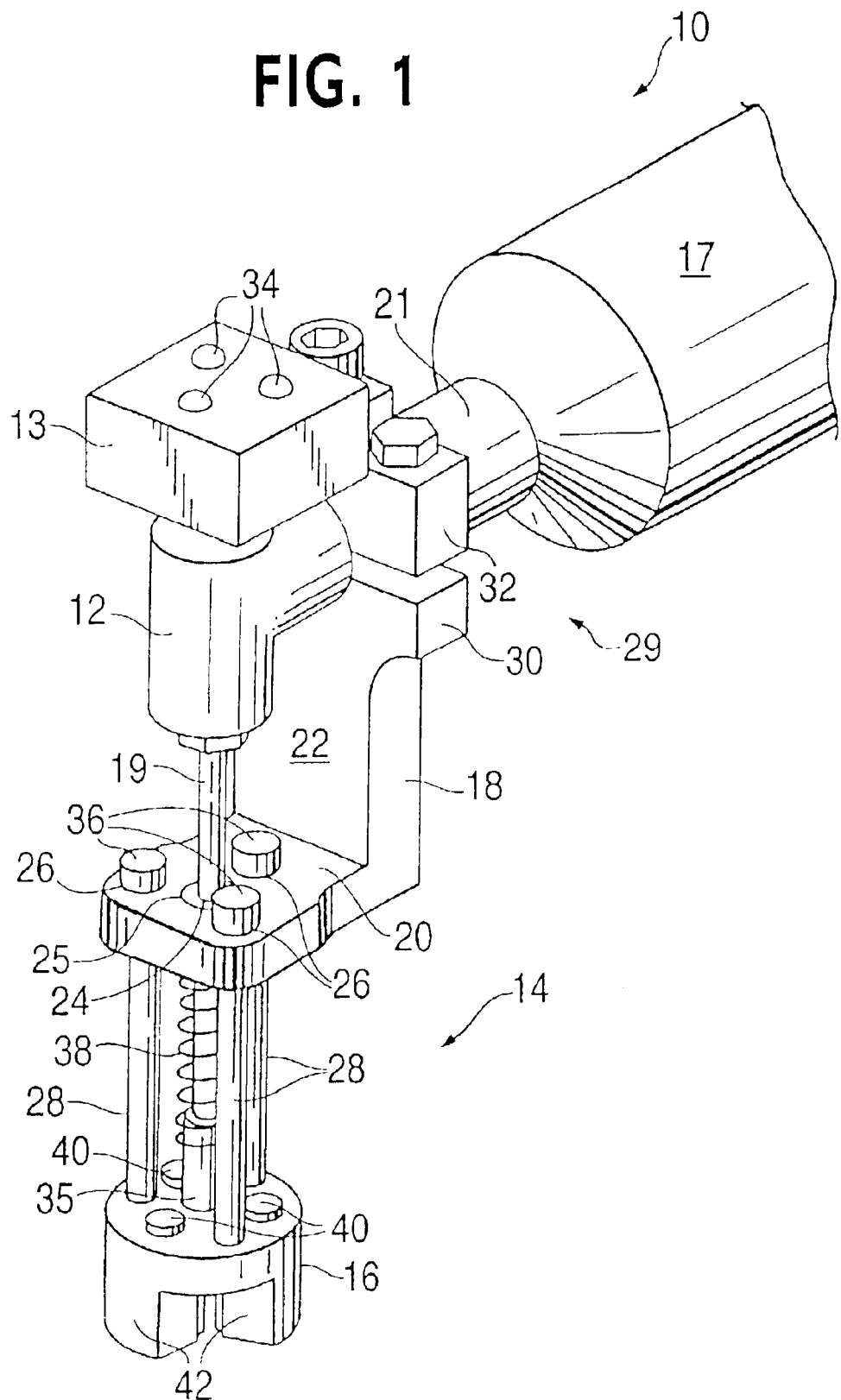
FIG. 1 is a perspective view of an indicator apparatus in accordance with an embodiment of the present invention, mounted to a drilling tool.

Some preferred embodiments of the invention provide for indicating a desired alignment relationship condition between a tool and a work surface. In some arrangements, the apparatus and method are utilized for indicating a desired angle such as perpendicularity, also referred to as normality herein, between a tool part such as, for example, drill bit and the work surface. It should be understood, however, that the present invention is not limited in its application to drilling tools or equipment, but, for example, can be used with other machine tools that require alignment between some aspect of the tool and the work surface. The invention will now be further described with reference to the drawing figures, in which like reference numerals refer to like parts throughout.

Referring now to the figures, FIG. 1 illustrates a drill normality indicator apparatus, generally designated 10, in accordance with an embodiment of the present invention. The apparatus 10 includes a chuck assembly 12, an indicator block 13, a drill guide 14, a foot 16, a drill having a motor 17, a drill bit 19 and a shaft 21.

The drill guide 14 includes a platform, generally designated 18, having a base 20 and a back 22. The base 20 includes a central bore 24 having a linear bearing or bushing 25, through which the drill bit 19 extends. The base 20 additionally includes three secondary bores, each designated 26, through which three support rods 28 extend, attaching the drill guide 14 to the foot 16, which is described herein in further detail. As depicted in FIG. 1, the bores 26 are preferably positioned about a circle concentric with the central bore 24 in an opposed, triangular relationship. Although three secondary bores 26 are depicted in the embodiment illustrated in FIG. 1, the number of secondary bores 26 may vary and preferably corresponds with the number of support rods 28 utilized.

The back 22 of the platform 14 has an upper bracket portion, generally designated 29, having a lower portion 30 and a separate mating portion 32. The mating portion 32 mates or connects to the lower portion 30 via bolt or screw connection to connect the drill 17 to the guide 14. The lower and upper portions 30, 32 each have an indentation for receiving the drill shaft 21 and connecting the drill guide 14 to the drill shaft 17. Reconfiguration of 20, 22, 30, and 32 is included for the adaptation of this device to other applications.

As illustrated in FIG. 1, the indicator 13 is mounted to the mating portion 32 of the bracket 29 via screw or bolt attachment, and includes three visual indicators 34. The visual indicators 34 are preferably light emitting diodes (LEDs) and/or liquid crystal displays (LCDs). The LEDs provide an indication when the foot 16 is resting fully flat on the work surface, and hence when the drill bit 19 is at the desired angle. Alternative indicator methods may also be employed.

As previously mentioned, the drill guide 14 includes three rods 28. The rods 28 are preferably oriented about a circle concentric with the bore 33 (see FIG. 2) of a raised vertical portion 35 that extends from the foot 16. Similar to the secondary bores 26, the rods 28 are oriented in an opposed triangular position such that their position corresponds with the secondary bores 26. The rods 28 extend through the secondary bores 26 and slidably engage the bores 26. The rods 28 extend from the base 20 of the drill guide 14 to the foot 16, where they attach thereto. As depicted in FIG. 1, the rods 28 each have a flange 36. The drill guide 14 also includes a biasing element, preferably a coil spring 38, disposed around the vertical portion 35. The spring 38 is preferably trapped between the vertical portion 35 and the base 20 of the platform 18.

Figure 2:
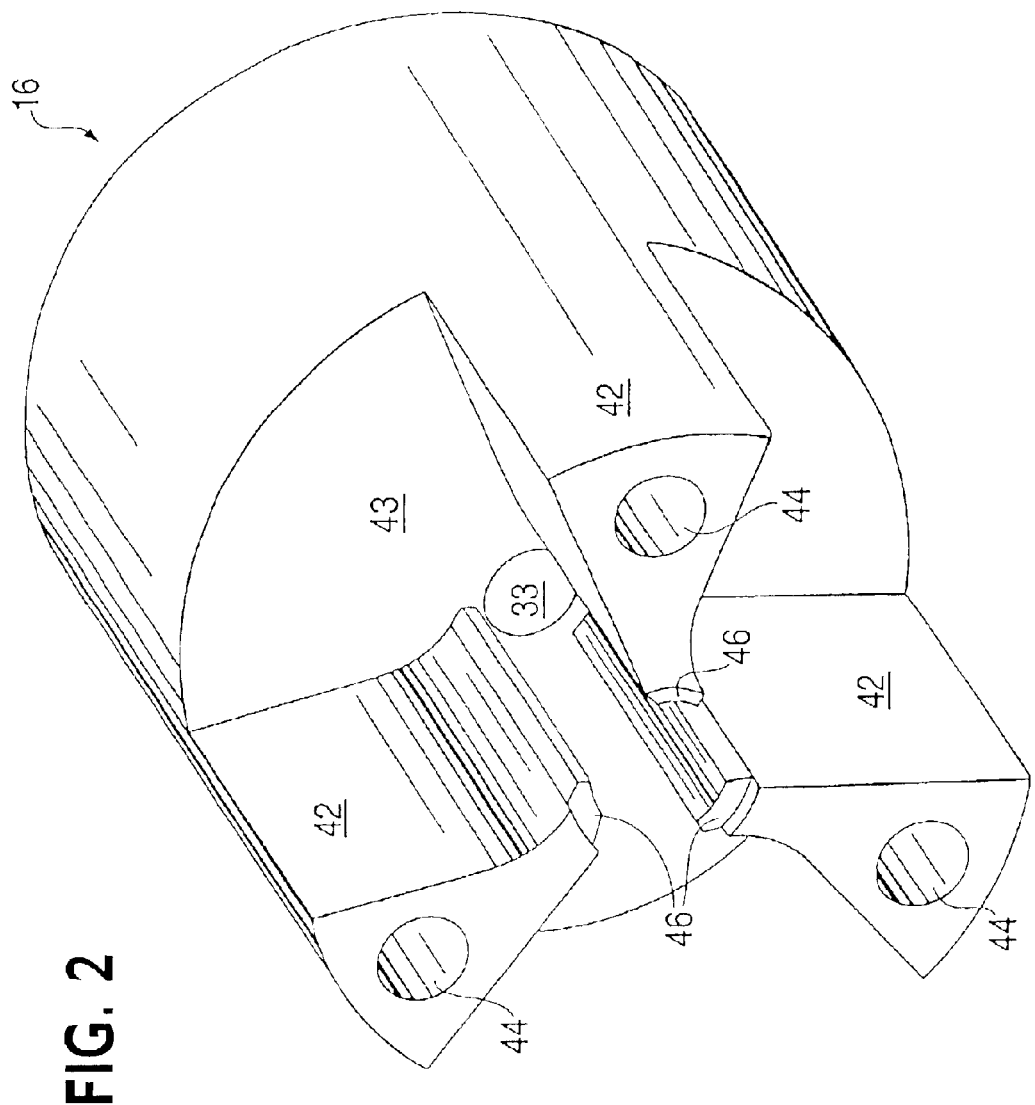
FIG. 2 is an enlarged perspective view of the foot of the indicator apparatus depicted in FIG. 1.

Referring now to FIGS. 1 and 2, the foot 16 is connected the drill guide 14 via the rods 28. The foot 14 includes the vertical portion 35 having a bore 33 as previously mentioned. More specifically, FIG. 2 depicts an enlarged perspective view of the foot 14 having three legs 42 that extend from a base 43 of the foot 16. As depicted, in FIG. 1, the legs 42 are arranged in an opposed triangular relationship, which corresponds to the triangular positioning of the LEDs 34 on the indicator block 13. The foot 16 also has three sensor switches 44, one switch 44 disposed on the each leg 42 respectively. The sensor switches 44 are connected to, and cause the to LEDs 34 to become illuminated, preferably via wire connection. As illustrated in FIG. 1, the switches 44 extend through the foot such that the top, wire end 40 of the switches 44 extend upward from the base 43. The aforementioned connection between the LEDs 34 and the switches 44 is such that a single switch 44 is connected only to a single LED 34. The switches 44 can be for example continual contact type switches that when closed, activate the respective LEDs 34 by closing a power circuit to actuate the LED's 34.

Figure 3:
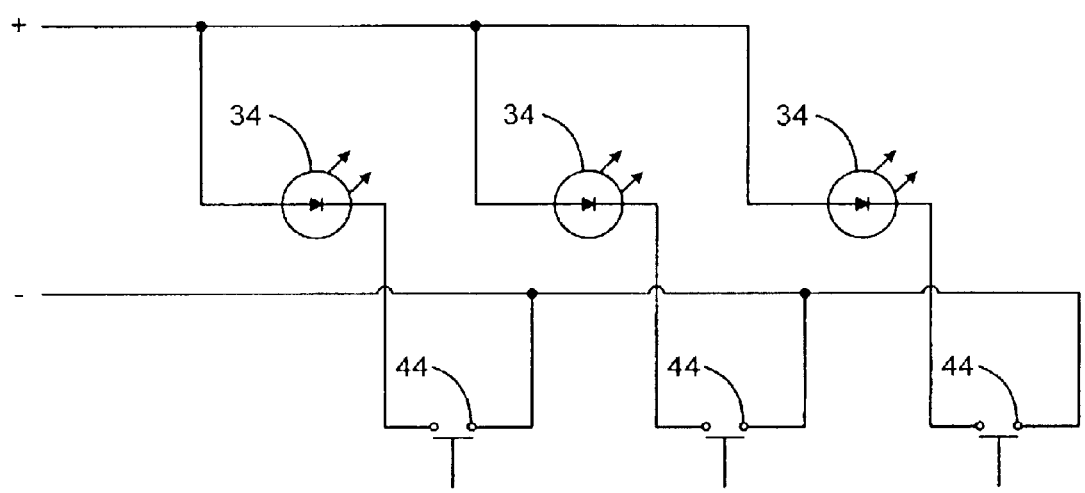
FIG. 3 is a schematic circuit diagram of a circuit used in the indicator apparatus.

FIG. 3 shows a preferred circuit arrangement for the switches 44 and LEDs 34. The switches 44 and the LEDs 34 are connected to a power source, and are oriented in a parallel arrangement. The power source may be located either on the apparatus 10, for example as a battery, or may be remotely located, such as a by connection to a standard electrical outlet.

Returning to FIG. 2, the legs 42 include integral edges 46 that extend axially upward from the distal end of each leg 42. The edges 46 are preferably oriented such that they are positioned about an imaginary cylinder concentric with the bore 33. The edges 46 alternatively need not be integral with the legs 42 and can be separate parts connected via attachment devices such as bolt, screw and/or weld. In addition, the edges 46 can extend along the entire upward length or alternatively only partially along the length of the legs 42.

During operation, the apparatus 10 preferably begins in a resting or starting position, similar to the position illustrated in FIG. 1. In the starting position, it is understood the base 20 of the platform 18 is biased against the flanges 36 of the rods 28 via the spring 38, and the drill bit 19 has been fed or inserted through the drill guide 14. In this position, the drill bit 19 extends from the chuck assembly 12, through the bushing 25 and spring 38, and down through the bore 33 of the foot 16, where it is ready to engage the work surface. Further, in the starting position, it is understood that a downward force has not yet been applied to the apparatus 10.

Upon the application of a downward force to the drill 17, the foot 16 is pressed against the surface of the work piece to be drilled. Downward force also causes the platform 18, and therefore the drill bit 19 to translate downward toward the work surface or piece. As the foot 16 is pressed fully flat against the work surface, all three switches 44 depress and close, illuminating all three LEDs 34. The illumination of all three LEDs 34 indicates that all three legs 42 of the foot 14 are in full contact with the work surface, and therefore indicates to the operator that the drill bit 19 at the desired angle to the work surface. Typically, the foot 14 is configured so that the drill bit 19 is normal or perpendicular to the work surface when all three LEDs 34 are lit. If, during operation, the drill bit 19 drifts or strays from normal, one or more of the legs 42 will "lift" upwardly, causing one or more of the switches 44 to no longer be depressed. As a result, the LED 34 which corresponds to the respective switch or switches 44, will cease to be illuminated, indicating to the operator a lack of normality, and also the direction of correctional movement required to bring the drill 17 back into a normal or perpendicular position.

Further, during operation, the platform 18 translates downward, sliding along the rods 28. As the platform 18 translates downward, the rods 28 function to guide the platform 18 and the drill bit 19, thus maintaining normality between the drill bit 19 and the work surface. When the platform 18 and/or drill 17 is translated upward, for example when the drill bit 19 is disengaged from the work piece, the flanges 36 act as an upper stop, limiting or stopping the upward translational movement.

Also, during operation, the edges 46 collectively act as a "chip breaker" that prevents chips or work surface byproducts that result from the drilling process, from building up and/or wrapping around the drill bit 19. This is preferable in some instances where the aforementioned build up would cause reduced process efficiency and/or obstruct the switches 44, hindering their functionality.

Although the preferred embodiment employs a foot 16 having three legs 42 to form a tripod, the foot 16 can have other shapes to form a base for the apparatus 10. For example, the foot 16 can alternatively have a lower flat ring that contacts the work surface instead of three legs 42. Also, although three switches 44 are preferred, a greater or lesser number may be alternatively employed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A device for indicating alignment between a tool and a work surface of a work piece, comprising:
a foot adapted to rest on the work surface;
a first indicator;
a first switch disposed on said foot and adapted for contact with the work surface, wherein said first switch activates said first indicator;
a first leg having a first distal end connected to said foot;
a second leg having a second distal end connected to said foot, and a third leg having a third distal end connected to said foot,
wherein said first, second and third legs each comprise an edge that extends along at least a portion of said first, second and third legs, wherein said edges collectively form a chip breaker.

2. The device according to claim 1, further comprising:
a second indicator; and
a second switch disposed on said foot and adapted for contact with the work surface, wherein said second switch activates said second indicator.

3. The device according to claim 2, further comprising:
a third indicator; and
a third switch disposed on said foot and adapted for contact with the work surface, wherein said third switch activates said third indicator.

4. The device according to claim 3, wherein said foot has a central opening therethrough and said first indicator, said second indicator and said third indicator are positioned about a circle surrounding said central opening.

5. The device according to claim 1, wherein said foot has a central opening therethrough and said first leg, said second leg, and said third leg are positioned in triangular, opposed relation to one another about a circle concentric with said central opening.

6. The device according to claim 3, wherein said first indicator is a first light emitting diode (LED), and wherein said second indicator is a second light emitting diode (LED), and wherein said third indicator is a third light emitting diode (LED).

7. The device according to claim 6, wherein each of said first LED, said second LED and said third LED emit light when each of said first switch, said second switch and said third switch are in the closed position, respectively.

8. The device according to claim 7, wherein each of said first LED, said second LED and said third LED are located substantially in a triangle corresponding to a triangle found by said first switch, said second switch, and said third switch respectively.

9. The device according to claim 8, wherein the predetermined angular relationship is a perpendicular relationship.

10. The device according to claim 3, wherein the tool is a drill with a drill bit having an axis of rotation, and the first, second and third indicator together indicate a predetermined angular relationship between the axis of rotation of the drill bit and the work surface.

11. The device according to claim 1, wherein said first indicator is a first light emitting diode (LED).

12. The device according to claim 1, wherein the tool is a drill with a drill bit having an axis of rotation, and the first indicator indicates a predetermined angular relationship between the axis of rotation of the drill bit and the work surface.

13. The device according to claim 12, wherein the predetermined angular relationship is a perpendicular relationship.

14. The device according to claim 1, further comprising a drill guide connected to said foot, said drill guide comprising:
a platform having a central bore and at least two secondary bores and a bracket portion;
at least two rods that slidably engage said at least two secondary bores and connect to said foot; and
a bushing disposed within said central bore.

15. The device according to claim 14, wherein said drill guide further comprises a coil spring that extends between said platform and said foot.

16. The device according to claim 3, wherein said first switch is disposed on said first distal end of said first leg, said second switch is disposed on said second distal end of said second leg and said third switch is disposed on said third distal end of said third leg.

17. A device for indicating alignment between a tool and a work surface comprising:
means for supporting a tool against the work surface wherein said means for supporting comprises:

a first leg having a first distal end;
a second leg having a second distal end; and
a third leg having a third distal end;
means for indicating disposed upon said means for supporting;
first means for switching disposed on said first leg;
second means for switching disposed on said second leg;
third means for switching disposed on said third leg; and
means for indicating an alignment condition responsive to said first, second and third switching means,
wherein said first, second and third legs each comprise an edge that extends along at least part of said first, second and third legs, wherein said edges collectively form a chip breaker.

18. A device according to claim 17, wherein said means for switching comprises three contact switches and wherein said first, second and third means for indicating comprises three light emitting diodes (LEDs).

19. A method for indicating alignment between a tool and a work surface of a work piece, comprising:
pressing a foot of an alignment device against the work surface so that at least one switch on the foot is activated, wherein the foot comprises:
a first indicator;
a first switch disposed on said foot and adapted for contact with the work surface, wherein said first switch activates said first indicator;
a second switch disposed on said foot and adapted for contact with the work surface, wherein said second switch activates a second indicator;
a third switch disposed on said foot and adapted for contact with the work surface, wherein said third switch activates a third indicator;
a first leg having a first distal end connected to said foot, wherein said first switch is disposed on said first distal end of said first leg;
a second leg having a second distal end connected to said foot, wherein said second switch is disposed on said second distal end of said second leg; and
a third leg having a third distal end connected to said foot, wherein said third switch is disposed on said third distal end of said third leg,
wherein said first, second and third legs each comprise an edge that extends along at least part of said first, second and third legs, wherein said edges collectively form a chip breaker; and
reading at least one of the indicators activated by the activation of at least one of the switches.

* * * * *